US007873633B2

(12) United States Patent
Smolyanskiy (10) Patent No.: US 7,873,633 B2
(45) Date of Patent: Jan. 18, 2011

(54) INTERLEAVING SEARCH RESULTS

(75) Inventor: Nikolay Smolyanskiy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 11/777,560

(22) Filed: Jul. 13, 2007

(65) Prior Publication Data

US 2009/0019030 A1      Jan. 15, 2009

(51) Int. Cl.
*G06F 17/30*      (2006.01)
(52) U.S. Cl. .............................. 707/728; 706/12; 706/20
(58) Field of Classification Search .................. None
See application file for complete search history.

(56) References Cited

U.S. PATENT DOCUMENTS

| 5,659,732 | A | 8/1997 | Kirsch | 395/605 |
| 5,826,261 | A | 10/1998 | Spencer | 707/5 |
| 6,763,356 | B2 | 7/2004 | Borchers | 707/10 |
| 6,850,932 | B2 | 2/2005 | De Judicibus | 707/3 |
| 7,127,416 | B1 | 10/2006 | Tenorio | 705/26 |
| 2002/0099685 | A1 | 7/2002 | Takano et al. | 707/1 |
| 2005/0050023 | A1 | 3/2005 | Gosse et al. | 707/3 |
| 2006/0047638 | A1* | 3/2006 | Dettinger et al. | 707/3 |
| 2006/0179045 | A1 | 8/2006 | Grinsfelder et al. | 707/3 |
| 2006/0212441 | A1 | 9/2006 | Tang et al. | 707/5 |
| 2007/0022111 | A1* | 1/2007 | Salam et al. | 707/5 |

OTHER PUBLICATIONS

Lou Si et al., "A Language Modeling Framework for Resource Selection and Results Merging." 7 pgs., http://www.es.cmu.edu/-pto/papers/_cikm_2002_DIST_L.M.pdf.
Doina Caragea et al., "Algorithms and Software for Collaborative Discovery from Autonomous, Semantically Heterogeneous. Distributed Information Sources." ALT 2005. LNAI 3734, pp. 13-44. 2005. http://www.es.iastate.edu/-ipathak/_AIT-2005.pdf.
John Ryan et al., "An Architecture for Information Retrieval from Distributed Heterogeneous Information Sources." 9 pgs., http://www.it.nuigalwayie/_publications/TR/abstracts/NUIG-IT-250901.pdf.

* cited by examiner

*Primary Examiner*—Charles Kim
*Assistant Examiner*—Anteneh Girma
(74) *Attorney, Agent, or Firm*—Merchant & Gould (57) ABSTRACT

Search result interleaving may be provided. First, a first list comprising online results may be received. Next, a second list comprising local results may be received. Then a subsequence common to the first list and the second list may be determined using a longest common subsequence algorithm. Next, an interleaved list may be created using the determined subsequence and a smart merge interleave algorithm to interleave the first list and the second list without hurting relevance.

20 Claims, 5 Drawing Sheets

| Offline | Online | LCS |
|---|---|---|
| W1 | W6 | |
| W2 | W2 | W2 |
| W3 | W3 | W3 |
| W4 | W7 | W4 |
| W5 | W1 | W5 |
| W6 | W4 | |
| W7 | W5 | |

INTERLEAVING SEARCH RESULTS

BACKGROUND

A help application is software that provides assistance with a hardware device or with software. Help systems for personal computers have conventionally followed a common standard and have used the same format. Auxiliary help systems such as those used in some software suites or "wizards" provide alternate methods, the latter taking users through a step-by-step solution. Furthermore, many applications default to the Internet and use hypertext markup language (HTML) pages as their documentation. The Internet affords a convenient way to keep documentation up-to-date.

Many help applications use data from both a local computer and from online sources such as the Internet. Search algorithms in help applications may use a merge process to combine results from the local computer and online sources. Conventional merge processes take online results and interleaves them with local results in a one-to-one fashion (e.g. online result, local result, next online result, next local result, etc.). This process may, however, hurt relevance because a poor local result may appear on a second position in a resulting merged list (as well as on $4^{th}$ position and so on).

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

First, a first list comprising at least a first result may be received. Next, a second list comprising at least a second result and a third result may be received. The third result may be listed subsequent to the second result in the second list. Then it may be determined that the first result corresponds to the second result. Next, an interleaved list may be created comprising the first result and the third result. The third result may be listed subsequent to the first result and the second result may be excluded from the interleaved list.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
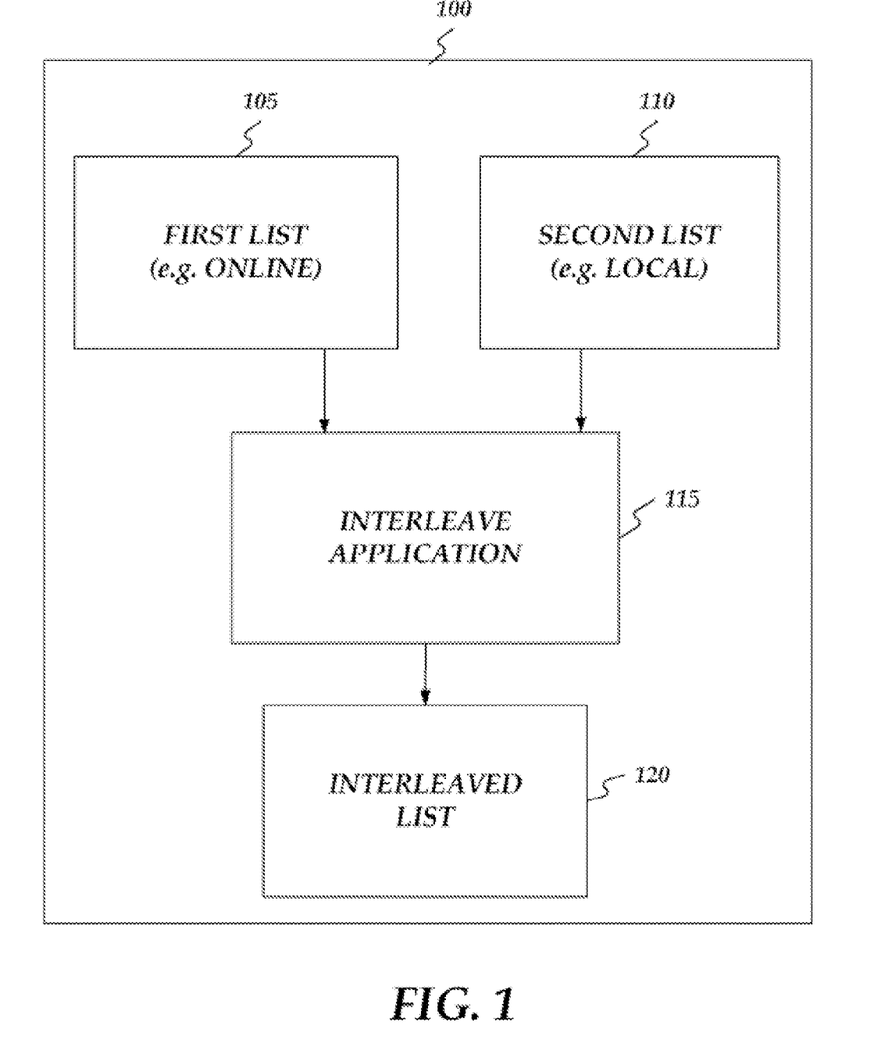
FIG. 1 is a block diagram of an operating environment.

As shown in FIG. 1, embodiments of the invention may provide a system 100 that performs searches over online (e.g. a first list 105) and local content (e.g. a second list 110) to satisfy a users search query. Some topics may only be local, for example, original equipment manufacturer (OEM) content or corporate help content. However, local content, in a local database on a local computer, may comprise topics that may also reside online. The online topics corresponding to the local topics may comprise newer or more current versions. Regardless of whether the topics are local or online, each document corresponding to a topic may be identified by a unique document ID (e.g. string based) or an asset key. Documents corresponding to search topics, whether found online or local, may be merged together using an interleave application 115. Duplicate local results (e.g. where a same topic is found online and local) may be removed and not included in an interleaved list 120. Interleave application 115 may produce interleaved list 120 without hurting relevance as described in greater detail below.

In conventional systems, different search algorithms (e.g. search engines) are respectively used for online and local topics. These different search algorithms, for example, use different weights thus their search results cannot be easily compared. Consequently, the conventional merge process cannot rely on conventional search weights for each result to compare them. For example, conventional merge processes take online results and interleaves them with local results in one-to-one fashion (e.g. online result, local result, next online result, next local result, etc.). Local results that correspond to topics that have online copies are removed from this list. Accordingly, this conventional process hurts relevance because a poor local result may appear on a second position in a resulted merged list (e.g. as well as on $4^{th}$ position and so on).

In short, conventional search algorithms configured for different content sources (e.g. local and online) are so different that the weights they give to different results in different sources cannot be compared without hurting relevance. Consistent with embodiments of the invention, an algorithm may be provided that may interleave search results from heterogeneous (e.g. local and online) sources without hurting relevance.

Figure 2:
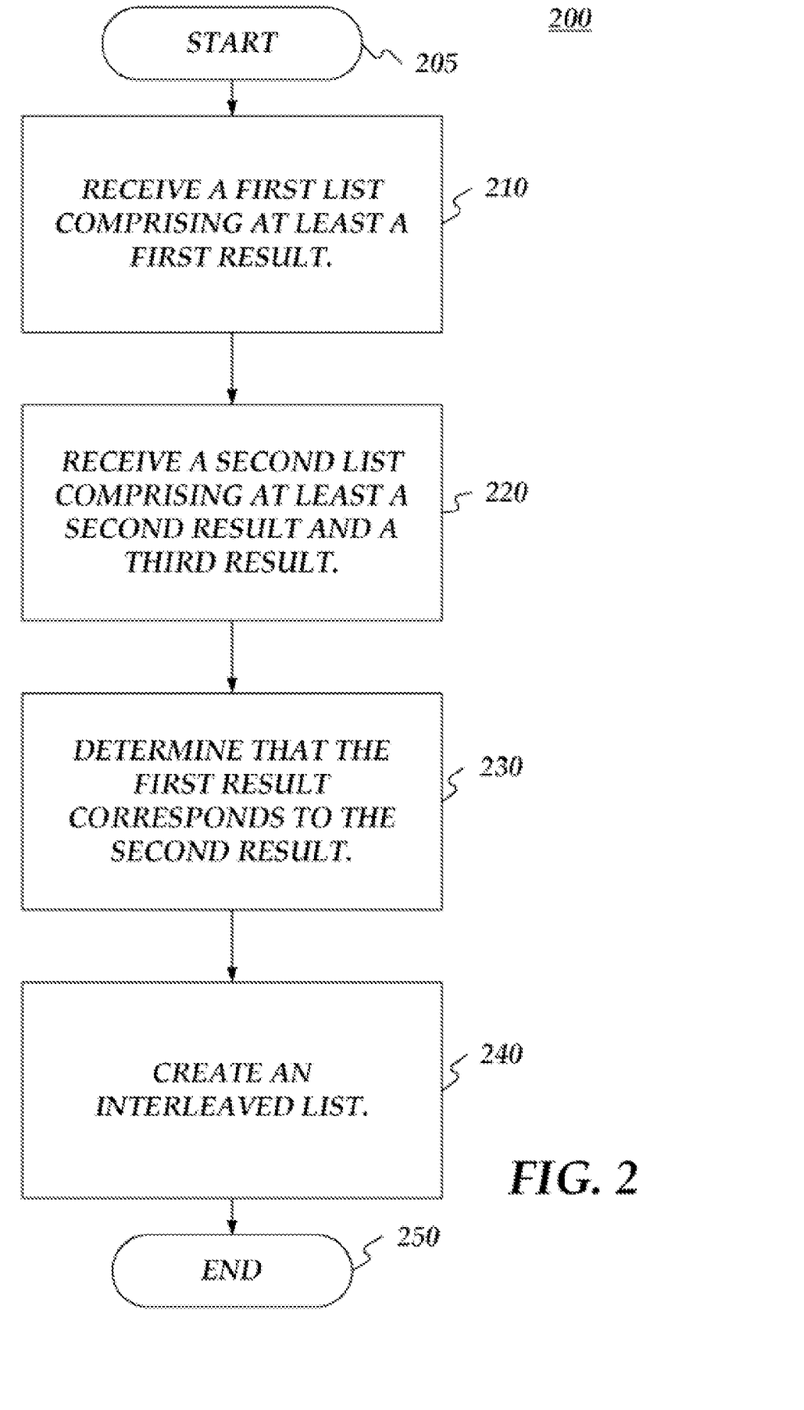
FIG. 2 is a flow chart of a method for interleaving search results.
Figure 3:
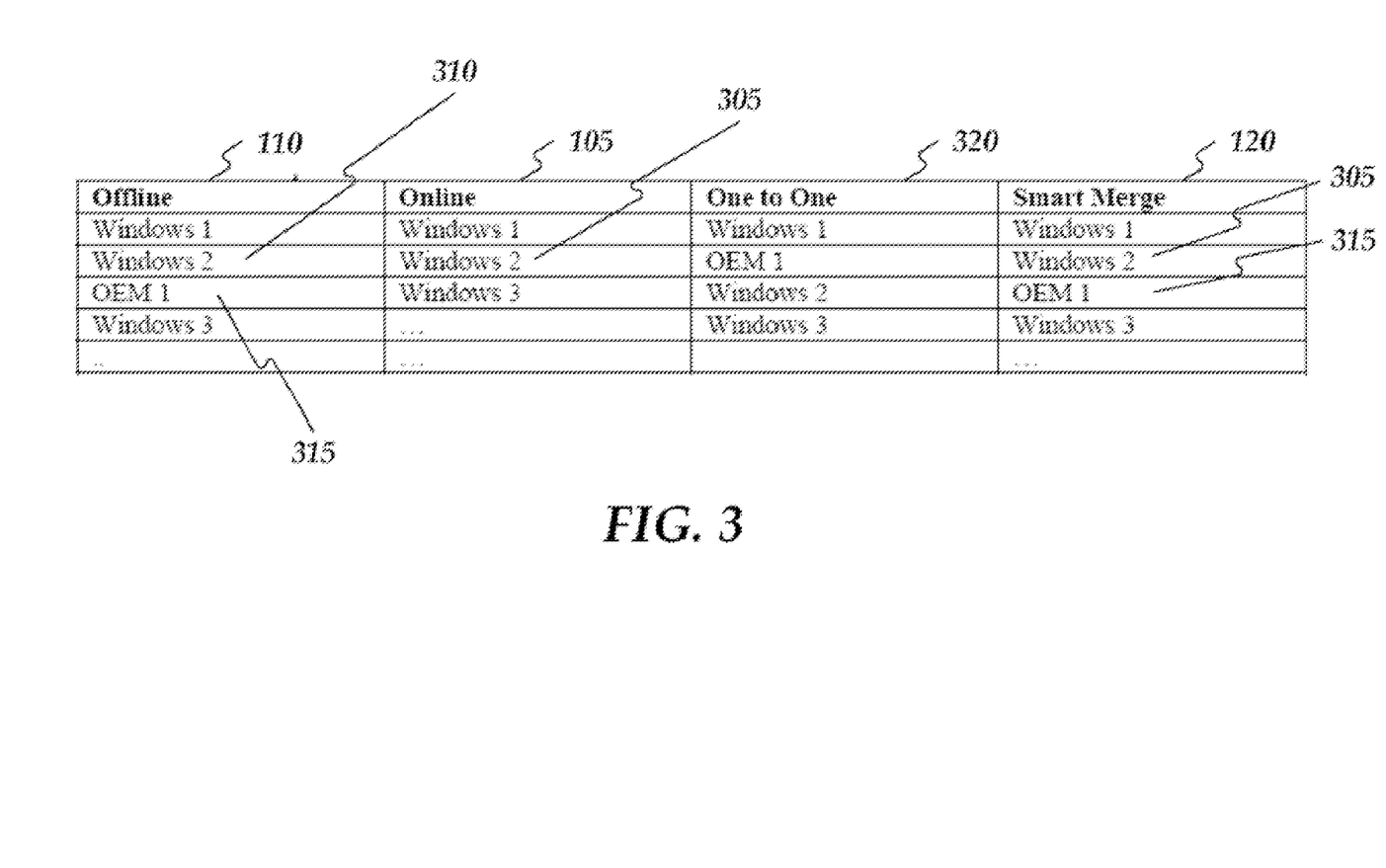
FIG. 3 is a diagram illustrating a smart merge interleave.

FIG. 2 is a flow chart setting forth the general stages involved in a method 200 consistent with an embodiment of the invention for interleaving search results. Method 200 may be implemented using a computing device 500 as described in more detail below with respect to FIG. 5. Ways to implement the stages of method 200 will be described in greater detail below. Method 200 may begin at starting block 205 and proceed to stage 210 where computing device 500 may receive first list 105 comprising at least a first result 305 as shown in FIG. 3. For example, first list 105 may comprise online results produced by a first search engine 522 as described in greater detail below with respect to FIG. 5. In other words, first list 105 may comprise results obtained, for example, from the internet and not obtained from databases local to computing device 500.

From stage 210, where computing device 500 receives first list 105, method 200 may advance to stage 220 where computing device 500 may receive second list 110 comprising at least a second result 310 and a third result 315 as shown in FIG. 3. Third result 315 may be listed subsequent to second result 310 in second list 110. For example, second list 110 may comprise local results produced by a second search engine 524 as described in greater detail below with respect to FIG. 5. In other words, second list 110 may comprise results obtained, for example, not from the internet, but obtained from databases local to computing device 500. Second list 110 may not have results obtained from the Internet physically (e.g. from an online search engine.) Rather second list 110 may have only local results (topics) some of which may also be in first list 105 (e.g. online) that came from second search engine 524 using a local database. For example, some topics happen to reside in both online sources and local sources and can be found by both search engines 522 and 524, though the online result may be more up-to-date.

Once computing device 500 receives the second list in stage 220, method 200 may continue to stage 230 where computing device 500 may determine that first result 305 corresponds to second result 310. For example, embodiments of the invention may interleave search results from heterogeneous (e.g. first list 105 and second list 110) sources without hurting relevance. Local results from second list 110 may be merged into special places in first list 105 to produce interleaved list 120. Because some online topics (e.g. first result 305 from first list 105) may also reside in second list 110, then when online search and local search happen, the same topics may appear in both lists (e.g. first list 105 and second list 110). In other words, some topics (e.g. documents) may reside in both online and local data sources and can be found by both search engines 522 and 524 that may search their respective data bases. So the resulting online (e.g. first result 305) and local (e.g. second result 310) lists may contain results that represent same topics (e.g. two copies—local and online of the same topic.)

The online list (e.g. first list 105) also may contain newer topics that do not appear in the local list (e.g. second list 110) and local search results may have local only topics that are not present in online list. But there still may be common results in both lists. Because both lists may be sorted in relevance order (i.e. best results come first), it is known that result #5 in the local list is worse than result #4 in the local list. Also, it is known that result #5 is local only (e.g. base on its attributes) and may not happen online, but result #4 may happen online and offline. Result #4 may also appear in the online list in some position #N. Consequently, because in the local list result #5 is worse than #4 and #4 is in the online list at position #N, then at most result #5 can be placed after result #4 in the online list or in position #N+1 or even after.

After computing device 500 determines that first result 305 corresponds to second result 310 in stage 230, method 200 may proceed to stage 240 where computing device 500 may create interleaved list 120 comprising first result 305 and third result 315. Third result 315 may be listed subsequent to first result 305 and second result 310 may be excluded from interleaved list 120. For example, interleave application 115 may merge local search results that come from searching local OEM or corporate content with online search results that come from searching online content. Conventional systems merge local search results in a one-to-one fashion with the online content regardless of how relevant either content is. A problem may arise when, for example, the OEM content has little to no relevance to a search topic and appears very low in an offline search, however, due to the merging may rise to the $2^{nd}$ topic in an online search. This problem, for example, can be solved with interleave application 115 using, for example, the smart merge interleave algorithm described below.

In an offline search (e.g. second list 110) OEM or corporate content may be ranked with local content. In any given search, the local (e.g. OEM or corporate content) may be higher, lower, or in between any local topics. For the most part, these local topics may be a subset of the online topics (e.g. shown in first list 105). For example, third result 315 (e.g. OEM 1 content) is between the Windows 2 and Windows 3 topics in the offline search (e.g. second list 110). In a one-to-one merge 320, the first OEM topic would appear between the first and second Windows topic, however, consistent with embodiments of the invention, OEM content (e.g. third result 315) may appear between the Windows 2 (e.g. first result 305) and Windows 3 topics in list 120. Once computing device 500 creates the interleaved list in stage 240, method 200 may then end at stage 250.

Consistent with embodiments of the inventions, a smart merge interleave algorithm may be used to interleave first list 105 and second list 110. Notwithstanding, the smart merge interleave algorithm may be used for merging from more than one online source and/or from more than one local source where different search engines may be used to produce results from each source (i.e. use different relevance metrics where their results may not be compared based on the relevance alone). Generally, the smart merge interleave algorithm may be applied to any situation where it is needed to merge search results from at least two different search engines with different relevance metrics, but operating on at least two corpus of data that share some documents (e.g. identical or very similar copies in each with the same ID). So the two corpus of data may be intersecting on some documents. Consequently, the smart merge interleave algorithm may not only be applicable to a help system, but to any system where a search federation may be needed and where some documents appear in all data stores (i.e. these documents may be used as common points in search results. Described below is one embodiment of this algorithm.

Figure 4:
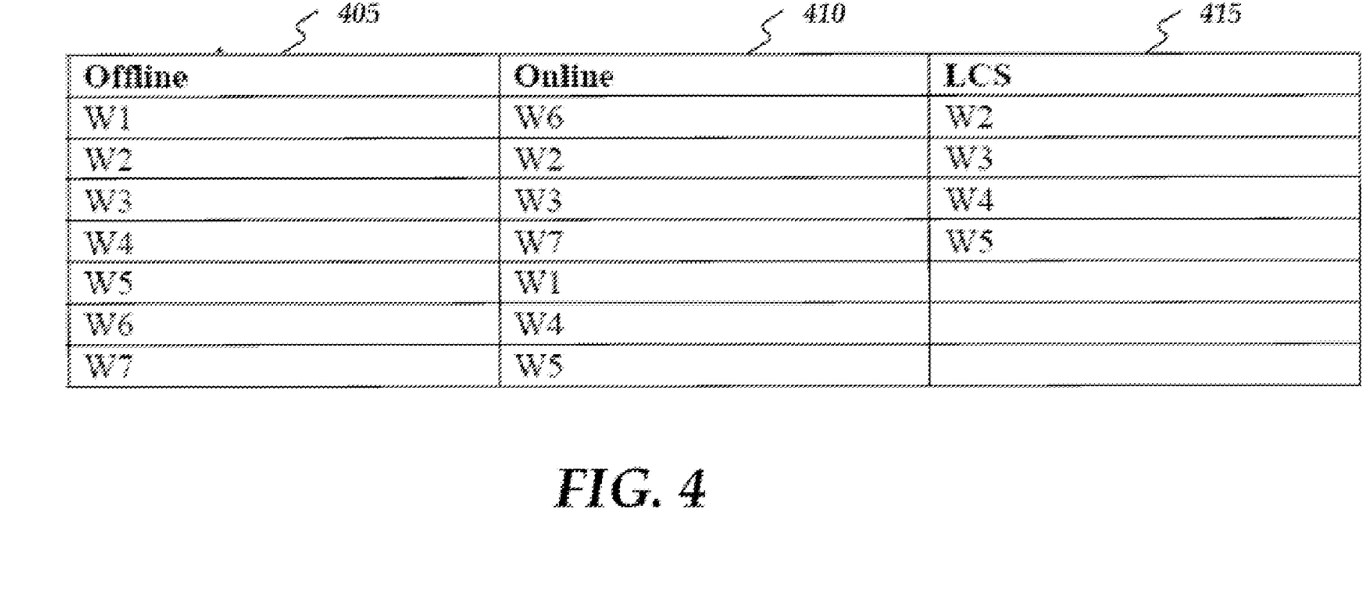
FIG. 4 is a diagram illustrating a longest common subsequence.

One problem addressed by the smart merge interleave algorithm is handling online and offline content not directly corresponding to each other. This problem, for example, may be similar to the longest common subsequence (LCS) problem. The LCS problem, for example, may comprise finding a longest sequence that is a subsequence of all sequences in a set of sequences (e.g. two sequences). The problem may be defined to be finding all longest common subsequences. As shown in FIG. 4, consistent with embodiments of the invention, the longest common subsequence of local results 405 (e.g. offline) that appear in online results 410 for a common query may be found. Consistent with embodiments of the invention, sample pseudo-code describing an example of the smart merge interleave algorithm follows. A line-by-line description of this example pseudo-code is described below.

A first stage in the smart interleave algorithm may be to compute the LCS. To compute the LCS, local results 405 and online results 410 may be passed to the smart interleave algorithm. To compute whether two results are identical, as described above, the results asset identifications may be compared. The LCS algorithm may return an LCS list 415 of topics that forms the LCS.

```
1  List OfflineTopics = getOfflineTopics(QueryString);
2  List OnlineTopics = getOnlineTopics(QueryString);
3  List LCSTopics = getLCS(OfflineTopics, OnlineTopics);
```

Iterators may then be created for all three lists (e.g. local results 405, online results 410, and LCS list 415) and set to the beginning of each. Also, a new list for a resulting page of topics may be created. The iterators may be run through using a while loop until either enough topics have been added to the page or the iterators have reached their end.

```
4  Iterator OfflineIter = OfflineTopics.begin( );
5  Iterator OnlineIter = OnlineTopics.begin( );
6  Iterator LCSIter = LCSTopics.begin( );
7
8  List ResultPage;
9
10 while(ResultPage.size( ) < NumberOfResults &&
       (OfflineIter != OfflineTopics.end( ) || OnlineIter !=
       OnlineTopics.end( ))
11 {
.. ...
44 }
```

Inside the loop, it may be determined whether the LCS iterator is not at the end. If there are still topics left in LCS list 415, the algorithm may determine if the next online topic is the same as the LCS topic. If the two topics are similar, then the algorithm may get the offline iterator up to date by skipping past all local content that is not in LCS list 415 and by adding, for example, all OEM/corporate content prior to the LCS entry to the page.

```
12  if(LCSIter != LCSTopics.end( ))
13  {
14      if(LCSIter->GetAssetID( ) == OnlineIter->GetAssetID( ))
15      {
16          while(OfflineIter->Namespace == "Windows" &&
                OfflineIter->GetAssetID( ) != LCSIter->GetAssetID( ))
17          {
18              ++OfflineIter,
19          }
..  ...
33      }
34      else
35      {
..  ...
38      }
39  }
40  else
41  {
..  ...
#   }
```

All OEM/corporate content in local results 405 before the next topic in LCS list 415 may be put into the page first. Once all of those topics are added, it is alright to add the LCS and then all iterators may be incremented appropriately.

```
21      if(OfflineIter->GetAssetID( ) != LCSIter->GetAssetID( ))
22      {
```

-continued

```
23          ResultPage.push_back(*OfflineIter);
24          ++OfflineIter,
25      }
26      else
27      {
28          ResultPage.push_back(*OnlineIter);
29          ++OfflineIter;
30          ++OnlineIter;
31          ++LCSIter;
32      }
```

If the LCS iterator and the online iterator are pointing to two different topics, that online topic may be added to the page. Any OEM/corporate topics may be interleaved.

```
36          ResultPage.push_back(*OnlineIter);
37          ++OnlineIter;
```

If the LCS iterator has reached its end, then all that may be left is a list of online and offline topics to fill up the rest of the page. Without a way to directly compare where OEM content falls in comparison to Online content, the one-to-one interleaving method may be used.

```
12  if(LCSIter != LCSTopics.end( ))
13  {
..  ...
39  }
40  else
41  {
42      // Do a one to one interleave, no algorithm necessary here
43  }
```

Following the completion of the while loop, ResultsPage may be filled up with interleaved data. If no LCS can be computed, the interleave may fall automatically to the one-to-one pattern. This can be examined further by saying if the LCS is too small, fallback to the one-to-one interleave. For example, the one-to-one interleave may be used if LCS list 415 comprises three or less elements.

An embodiment consistent with the invention may comprise a system for providing interleaving search results. The system may comprise a memory storage and a processing unit coupled to the memory storage. The processing unit may be operative to receive a first list comprising at least a first result and to receive a second list comprising at least a second result and a third result. The third result may be listed subsequent to the second result in the second list. In addition, the processing unit may be operative to determine that the first result corresponds to the second result and to create an interleaved list comprising the first result and the third result. The third result may be listed subsequent to the first result and the second result is excluded from the interleaved list.

Another embodiment consistent with the invention may comprise a system for providing interleaving search results. The system may comprise a memory storage and a processing unit coupled to the memory storage. The processing unit may be operative to receive a first list comprising online results and to receive a second list comprising local results. In addition, the processing unit may be operative to determine a subsequence common to the first list and the second list. Moreover, the processing unit may be operative to create, when a number of elements in the subsequence is greater than a predetermined value, an interleaved list from the first list and the second list. The processing unit may be further operative to place in the interleaved list references from the first list for references common to both the first list and the second list. In addition, the processing unit may be further operative to place in the interleaved list references from the second list not common to both the first list and the second list. Relevance for the references from the second list not common to both the first list and the second list may be preserved in the interleaved list by using the relative location in the second list of references from the second list not common to both the first list and the second list.

Yet another embodiment consistent with the invention may comprise a system for providing interleaving search results. The system may comprise a memory storage and a processing unit coupled to the memory storage. The processing unit may be operative to receive a first list comprising online results and to receive a second list comprising local results. Moreover, the processing unit may be operative to determine a subsequence common to the first list and the second list using a longest common subsequence algorithm and to create an interleaved list using a smart merge interleave algorithm to interleave the first list and the second list.

Figure 5:
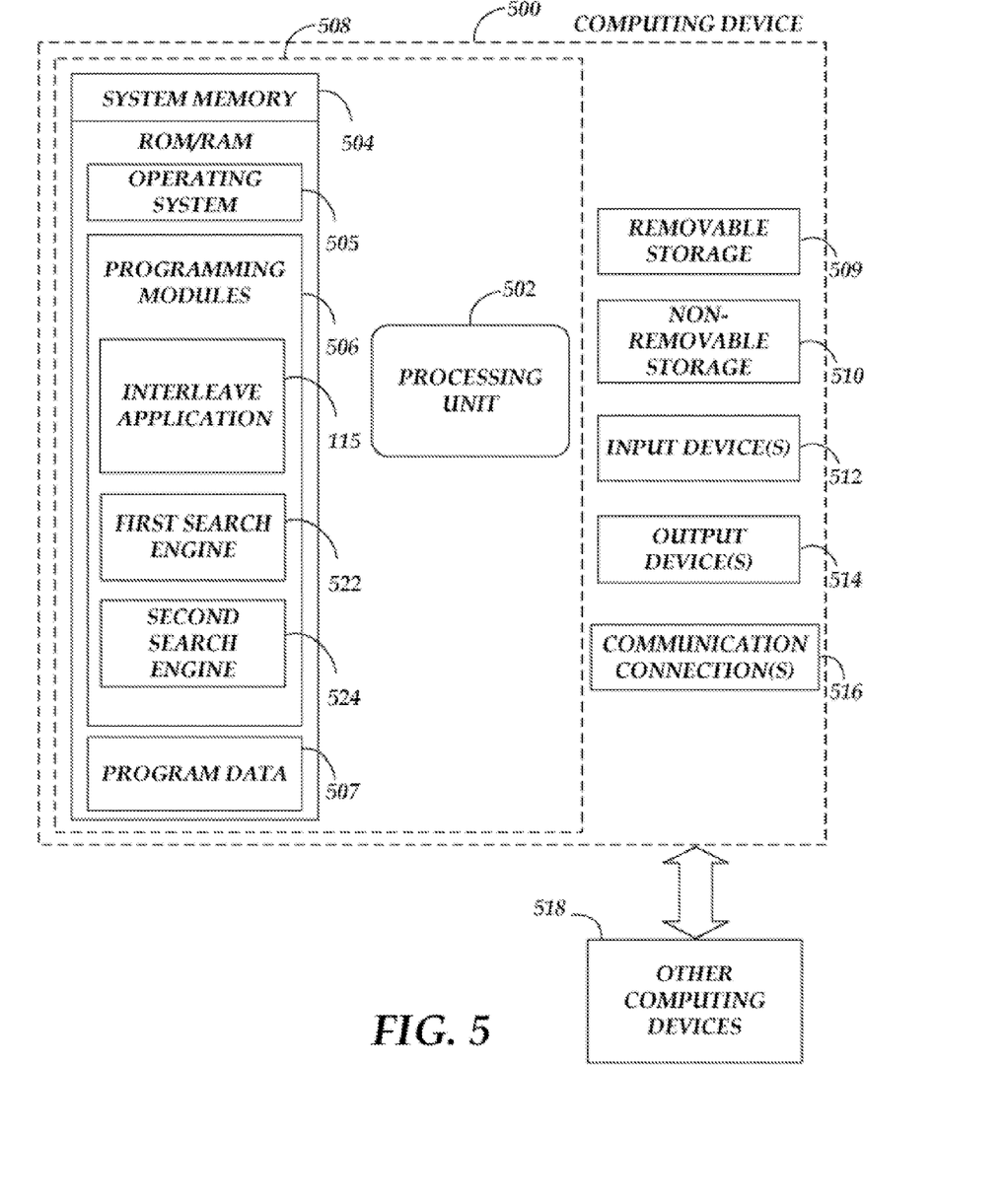
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 100 as described above. System 100 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include interleave application 115, first search engine 522, and second search engine 524. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage). Computer storage media may include, but is not limited to, RAM, ROM, electrically erasable read-only memory (EEPROM), flash memory or other memory technology, CAROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. interleave application 115, first search engine 522, second search engine 524) may perform processes including, for example, one or more method 200's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for interleaving search results, the method comprising:
   receiving a first list comprising at least a first result;
   receiving a second list comprising at least a second result and a third result, the third result listed subsequent to the second result in the second list, wherein receiving a second list comprises receiving the second list having:
      results obtained from a first database different than a second database used to obtain at least the first result of the first list, and
      results obtained using a first algorithm different than a second algorithm used to obtain at least the first result of the first list;
   determining that the first result corresponds to the second result; and
   creating an interleaved list comprising the first result and the third result, wherein the third result is listed subsequent to the first result and the second result is excluded from the interleaved list, wherein creating the interleaved list comprises comparing a first set of relevance values associated with the first list with a second set of relevance values associated with the second list, the first set of relevance values being dependent on the first algorithm and being different from the second set of relevance values dependent on the second algorithm.

2. The method of claim 1, wherein receiving the first list comprises receiving the first list comprising online results.

3. The method of claim 1, wherein receiving the second list comprises receiving the second list comprising local results.

4. The method of claim 1, wherein receiving the second list comprises receiving the second list wherein the first result is a more current version of the second result received in the second list.

5. The method of claim 1, wherein receiving the second list comprises receiving the second list wherein no version of the third result is available online.

6. The method of claim 1, wherein receiving the second list comprises receiving the second list wherein the third result comprises original equipment manufacturer (OEM) data.

7. The method of claim 1, wherein determining that the first result corresponds to the second result comprises determining that an asset identification associated with the first result corresponds to an asset identification associated with the second result.

8. The method of claim 1, wherein receiving the first list comprises receiving the first list comprising a reference.

9. The method of claim 8, wherein creating the interleaved list comprises creating the interleaved list comprising the reference.

10. The method of claim 1, wherein receiving the first list comprises receiving the first list from a first search engine that used a first search algorithm to create the first list.

11. The method of claim 1, wherein receiving the first list comprises receiving the first list from a first search engine that used a first search algorithm to create the first list, the first search algorithm configured to search a local database on a local computing device.

12. The method of claim 1, wherein receiving the second list comprises receiving the second list from a second search engine that used a second search algorithm to create the second list.

13. The method of claim 1, wherein receiving the second list comprises receiving the second list from a second search engine that used a second search algorithm to create the second list, the second search algorithm configured to search databases not on a local computing device.

14. A computer-readable storage medium which stores a set of instructions which when executed performs a method for interleaving search results, the method executed by the set of instructions comprising:
   receiving a first list comprising online results, wherein receiving the first list comprising the online results comprises receiving the first list obtained using a first algorithm, the first algorithm having a first result relevance metric;
   receiving a second list comprising local results, wherein receiving the second list comprising the local results comprises receiving the second list obtained using a second algorithm, the second algorithm having a second result relevance metric;
   determining a subsequence common to the first list and the second list; and
   creating, when a number of elements in the subsequence is greater than a predetermined value, an interleaved list from the first list and the second list, wherein creating the interleaved list further comprises,
      placing, in the interleaved list, a first set of references from the first list common to both the first list and the second list, and
      placing, in the interleaved list, a second set of references from the second list not common to both the first list and the second list, wherein relevance for the second set of references from the second list not common to both the first list and the second list is preserved in the interleaved list by using a relative location of the second set of references in the second list not common to both the first list and the second list, wherein using the relative location of the second set of references in the second list not common to both the first list and the second list comprises comparing the first result relevance metric with the second result relevance metric.

15. The computer-readable storage medium of claim 14, wherein determining the subsequence common to the first list and the second list comprises using a Longest Common Subsequence algorithm.

16. The computer-readable storage medium of claim 14, wherein receiving the second list comprises receiving the second list wherein the local results comprise original equipment manufacturer (OEM) data.

17. The computer-readable storage medium of claim 14, wherein creating, when the number of elements in the subsequence is greater than the predetermined value, the interleaved list comprises creating, when the number of elements in the subsequence is greater than the predetermined value comprising three.

18. The computer-readable storage medium of claim 14, further comprising creating, when the number of elements in the subsequence is one of less than the predetermined value and equal to the predetermined value, the interleaved list using a one-to-one algorithm to interleave the first list and the second list.

19. A system for interleaving search results, the system comprising:
   a memory storage; and
   a processing unit coupled to the memory storage, wherein the processing unit is operative to:
      receive a first list comprising online results, the first list being obtained using a first algorithm having a first set of relevance metrics;
      receive a second list comprising local results, the second list being obtained using a second algorithm having a second set of relevance metrics;
      determine a subsequence common to the first list and the second list using a longest common subsequence algorithm; and
      create an interleaved list using the determined subsequence and a smart merge interleave algorithm to interleave the first list and the second list, wherein the smart merge interleave algorithm compares the first set of relevance metrics with the second set of relevance metrics.

20. The system of claim 19, wherein the processing unit being operative to receive the second list comprises the processing unit being operative to receive the second list wherein the local results comprise original equipment manufacturer (OEM) data.

* * * * *